US012659229B2

(12) United States Patent (10) Patent No.: US 12,659,229 B2
Ji (45) Date of Patent: Jun. 16, 2026

(54) VALIDATING NETWORK FEATURES IN A WIRELESS NETWORK USING AN AUDIT MODE IN SYSTEM CONFIGURATION

(71) Applicant: T-Mobile Innovations LLC, Overland Park, KS (US)

(72) Inventor: Rongjie Ji, Lisle, IL (US)

(73) Assignee: T-Mobile Innovations LLC, Overland Park, KS (US)

( * ) Notice: Subject to any disclaimer, the term of this patent is extended or adjusted under 35 U.S.C. 154(b) by 193 days.

(21) Appl. No.: 18/476,564

(22) Filed: Sep. 28, 2023

(65) Prior Publication Data

US 2025/0112826 A1 Apr. 3, 2025

(51) Int. Cl.
*H04L 41/0869* (2022.01)
*H04L 41/0816* (2022.01)
*H04L 41/0893* (2022.01)

(52) U.S. Cl.
CPC ...... *H04L 41/0869* (2013.01); *H04L 41/0816* (2013.01); *H04L 41/0893* (2013.01)

(58) Field of Classification Search
CPC ............. H04L 41/0816; H04L 41/0869; H04L 41/0893
See application file for complete search history.

(56) References Cited

U.S. PATENT DOCUMENTS

| | | | |
|---|---|---|---|
| 10,516,999 B1 * | 12/2019 | Desai ..................... | H04W 16/28 |
| 11,496,939 B2 | 11/2022 | Subramaniam et al. | |
| 11,516,999 B2 | 12/2022 | Pan | |
| 2012/0005527 A1 * | 1/2012 | Engel ................. | H04N 21/2408 |
| | | | 714/E11.02 |
| 2024/0187836 A1 * | 6/2024 | Ball ...................... | H04W 24/02 |

* cited by examiner

*Primary Examiner* — Jamie J Atala
(74) *Attorney, Agent, or Firm* — Jones Burke, PLLC

(57) ABSTRACT

Validating network features in a wireless network includes receiving information associated with a network feature for use by at least one access node from a set of access nodes in a geographic area, the network feature having at least one network operating parameter not previously available in the wireless network, performing a configuration operation, in an audit mode, on the set of access nodes to use the network feature based on a set of existing profiles for the set of access nodes, determining if the configuration operation in the audit mode resulted in a validation error for one of the access nodes from the set of access nodes, and performing a configuration operation, in a realtime mode, on the set of access nodes to use the network feature if it is determined that configuration operation in the audit mode did not result in a validation error.

20 Claims, 8 Drawing Sheets

RECEIVE INFORMATION FOR A NETWORK FEATURE HAVING A NETWORK OPERATING PARAMETER NOT PREVIOUSLY AVAILABLE
410

PERFORM CONFIGURATION OPERATION IN AUDIT MODE ON A SET OF ACCESS NODES TO USE THE NETWORK FEATURE BASED ON A SET OF EXISTING PROFILES
420

DETERMINE IF CONFIGURATION OPERATION IN AUDIT MODE RESULTED IN A VALIDATION ERROR
430

PERFORM CONFIGURATION OPERATION IN REALTIME MODE IF CONFIGURATION OPERATION IN AUDIT MODE DID NOT RESULT IN A VALIDATION ERROR
440

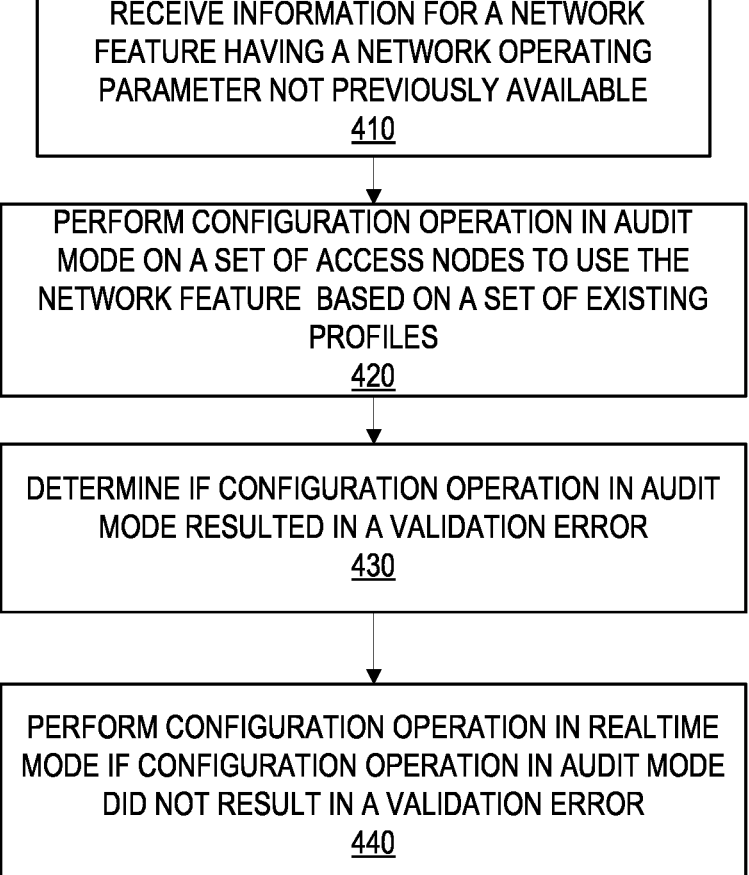

RECEIVE INFORMATION FOR A NETWORK
FEATURE HAVING A NETWORK OPERATING
PARAMETER NOT PREVIOUSLY AVAILABLE
410

PERFORM CONFIGURATION OPERATION IN AUDIT
MODE ON A SET OF ACCESS NODES TO USE THE
NETWORK FEATURE  BASED ON A SET OF EXISTING
PROFILES
420

DETERMINE IF CONFIGURATION OPERATION IN AUDIT
MODE RESULTED IN A VALIDATION ERROR
430

PERFORM CONFIGURATION OPERATION IN REALTIME
MODE IF CONFIGURATION OPERATION IN AUDIT MODE
DID NOT RESULT IN A VALIDATION ERROR
440

| Technical Parameters | BW (MHz) | DSS | SA/NSA | Control Channel mode | BWP_type Initial | BWP_type Large Dedicated | BWP_type Small Dedicated | BWP_type Power Saving |
|---|---|---|---|---|---|---|---|---|
| 520 | 522 | 524 | 526 | 528 | 530 | 532 | 534 | 536 |
| FDD | 5 | nonDSS | SA/both | Long code | Profile 102 | Profile 107 | | |
| FDD | 10 | nonDSS | SA/both | Long code | Profile 101 | Profile 109 | | |
| TDD | 100 | nonDSS | SA/both | Long code | Profile 84 | Profile 200 | | |
| TDD Power Saving | 100 | nonDSS | SA/both | Long code | Profile 85 | Profile 210 | | Profile 80 |
| Small Dedicated BWP | 98 | nonDSS | SA/both | Long code | Profile 191 | Profile 210 | Profile 237 | Profile EE |
| Small Dedicated BWP | 50 | nonDSS | SA/both | | Profile 180 | Profile 204 | Profile 203 | |
| TDD | 50 | nonDSS | NSA | | Profile 0 | Profile 44 | | |
| TDD | 100 | nonDSS | NSA | | Profile 0 | Profile 44 | | |
| TDD=77 | 20 | nonDSS | SA/both | Long code | Profile 104 | Profile 202 | | |

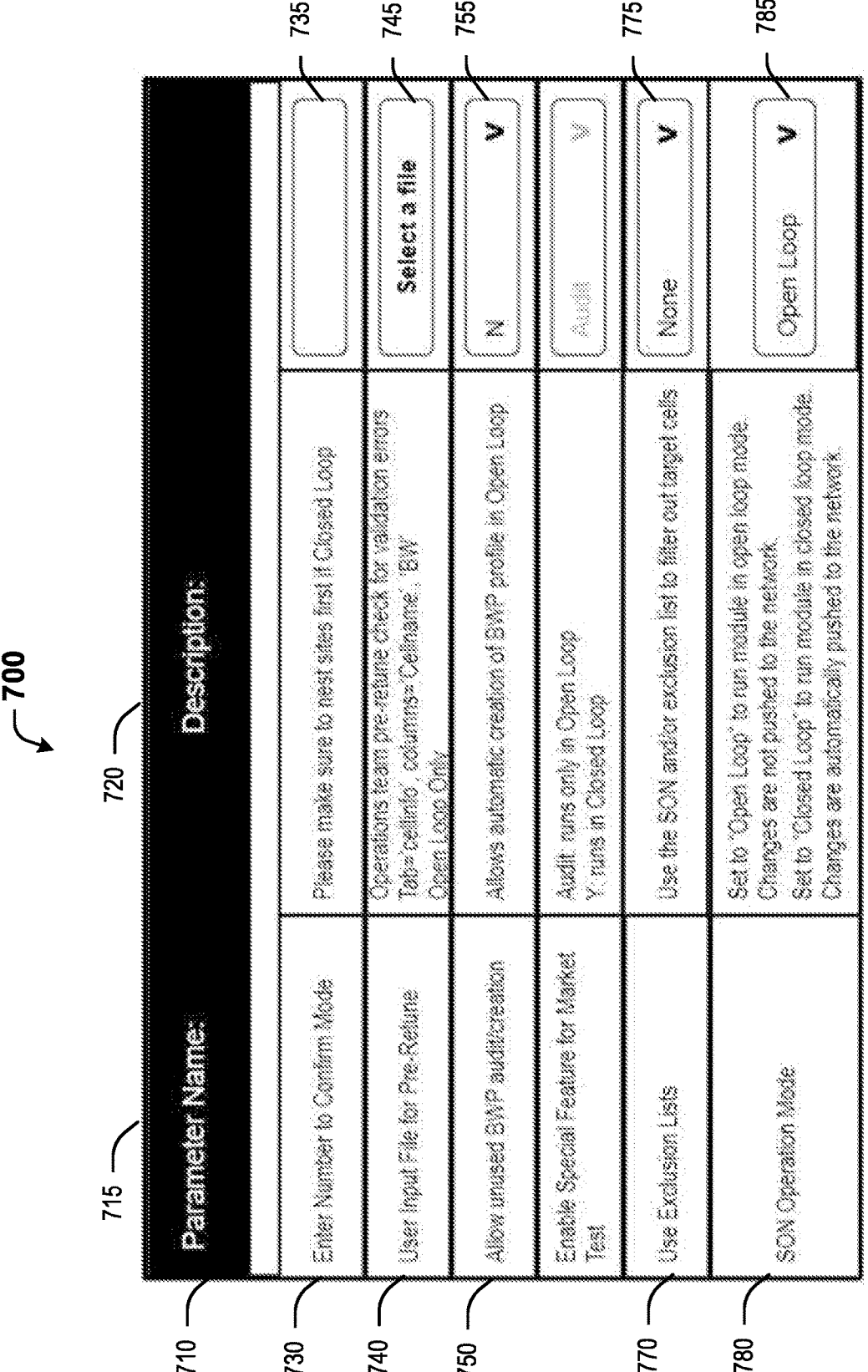

| Parameter Name: | Description: | |
|---|---|---|
| Enter Number to Confirm Mode | Please make sure to next sites first if Closed Loop | |
| User Input File for Pre-Retune | Operations team pre-retune check for validation errors. Tab='cellinfo, columns='Cellname', 'BW'. Open Loop Only | Select a file |
| Allow unused BMP audit/creation | Allows automatic creation of BMP profile in Open Loop | N ˅ |
| Enable Special Feature for Market Test | Audit runs only in Open Loop. Y runs in Closed Loop | ˅ |
| Use Exclusion Lists | Use the SON and/or exclusion list to filter out target cells | None ˅ |
| SON Operation Mode | Set to 'Open Loop' to run module in open loop mode. Changes are not pushed to the network. Set to 'Closed Loop' to run module in closed loop mode. Changes are automatically pushed to the network. | Open Loop ˅ |

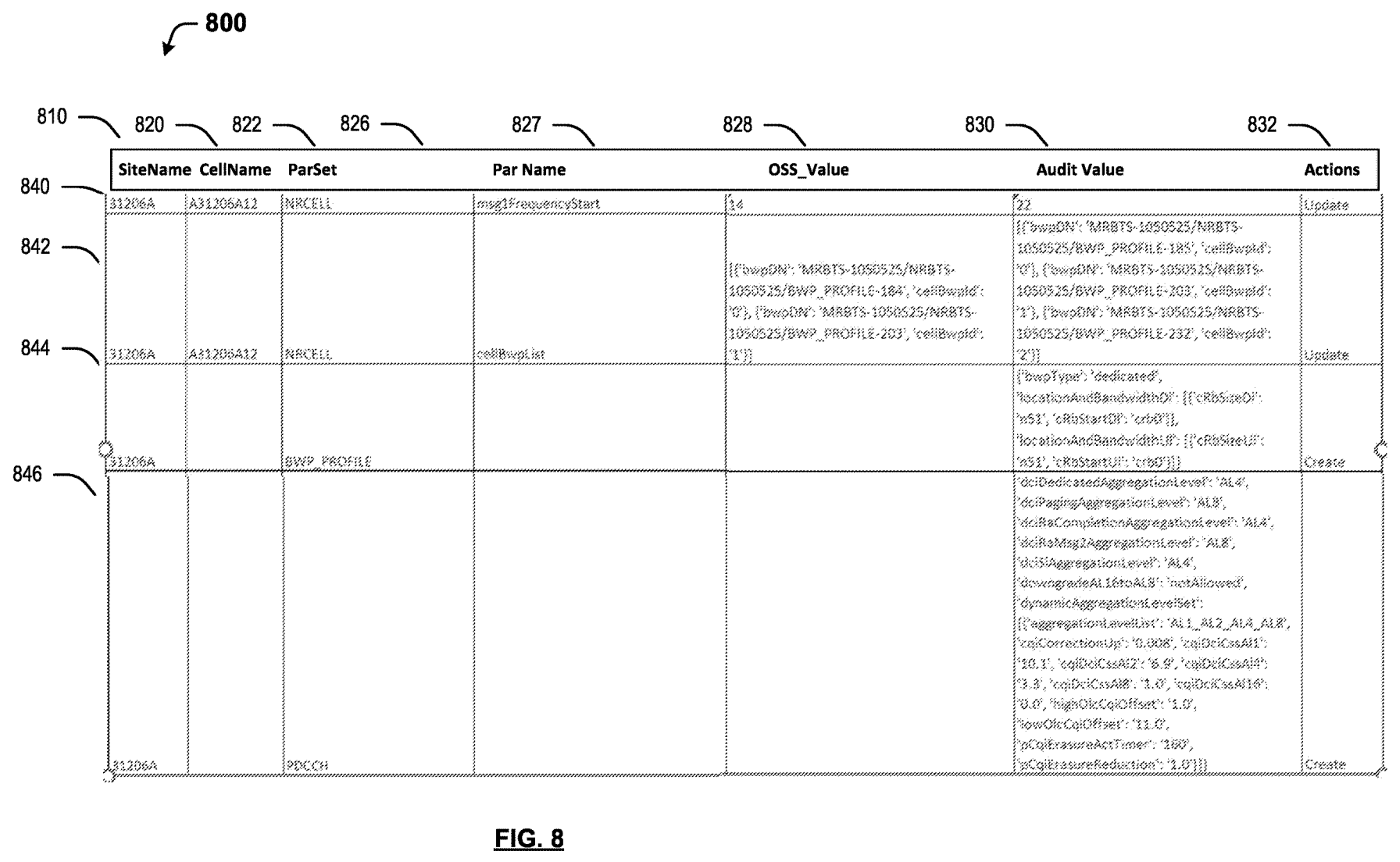

| SiteName | CellName | ParSet | Par Name | OSS_Value | Audit Value | Actions |
|----------|----------|--------|----------|-----------|-------------|---------|
| 3132l6A | A3132l6A12 | NRCELL | msg1FrequencyStart | 14 [{'bwpDN': 'MRBTS-1050525/NRBTS-1050525/BWP_PROFILE-184', 'cellBwpId': '0'}, {'bwpDN': 'MRBTS-1050525/NRBTS-1050525/BWP_PROFILE-203', 'cellBwpId': '1'}] | 22 [{'bwpDN': 'MRBTS-1050525/NRBTS-1050525/BWP_PROFILE-184', 'cellBwpId': '0'}, {'bwpDN': 'MRBTS-1050525/NRBTS-1050525/BWP_PROFILE-303', 'cellBwpId': '1'}, {'bwpDN': 'MRBTS-1050525/NRBTS-1050525/BWP_PROFILE-232', 'cellBwpId': '2'}] | Update |
| 3132l6A | A3132l6A12 | NRCELL | cellBwpInit | | {'bwpType': 'dedicated', ...} | Update |
| 3132l6A | | BWP_PROFILE | | | | Create |
| 3132l6A | | PDCCH | | | | Create |

FIG. 8

VALIDATING NETWORK FEATURES IN A WIRELESS NETWORK USING AN AUDIT MODE IN SYSTEM CONFIGURATION

TECHNICAL BACKGROUND

A wireless network, such as a cellular network, can include a plurality of access nodes (e.g., base stations), with each access node serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, 5G NR next generation NodeBs (gNodeBs) or alternatively may be exclusively 5G cellular systems. Wireless devices closer to a 5G antenna are more likely to receive the benefits of the 5G technology.

As wireless networks evolve and grow, there are ongoing challenges in providing high quality service and higher performance to increasing numbers of wireless devices in various coverage areas of the wireless network. These challenges are compounded as new network features are added to the operation of the network. These new network features may include, but are not limited to, a combination of one or more of frequency ranges or bands of operation, channel frequencies, channel bandwidths, duplexing modes, and power saving modes. The new network features can provide higher performance and/or, increase the operational efficiency of the network. In order to implement some of these new network features, the configuration of the wireless network may also need to change. However, making a change to the configuration of the wireless network, particularly over a broad geographical area all at once, can result in an initial performance degradation if there is an error in the configuration change. The performance degradation may include an increase in dropped calls, reduced data rates for customers, or lower values of other key process indicators. Although the performance degradation is temporary until the issues with the configuration of the wireless network can be addressed, the overall quality of customer experience is reduced. However, the issues can be compounded depending on whether the issue occurs due to a mismatch with the RAT used by the access nodes.

One common solution for addressing issues with the introduction of new network features in wireless networks is to reduce the size of the geographical area to which the configuration change is made and to roll out the configuration change to different geographic areas one at a time. In this way, a larger effort can be placed on reducing any issues in the configuration as a result of the change as well as identifying and fixing the issues on a smaller scale before implementing the configuration change in other geographic areas. However, this approach can become very inefficient as the larger effort typically involves human review. Inevitably, issues will remain that end up only being found once the configuration change is implemented in realtime in the wireless network. Further, the growing trend has been to continually improve the performance of the wireless network resulting in a larger number of network features being added at an increasing rate.

Accordingly, a solution is needed that reduces the impact of configuration changes in wireless networks as a result of the introduction of new network features.

Overview

Exemplary embodiments described herein include methods, systems, and processing nodes for identifying neighbor access nodes in a wireless network. An exemplary method for validating features in a wireless network includes receiving information associated with a network feature for use by at least one access node from a set of access nodes in a geographic area, the network feature having at least one network operating parameter not previously available in the wireless network, performing a configuration operation on the set of access nodes to use the network feature based on a set of existing profiles for the set of access nodes, the configuration operation run in an audit mode, determining if the configuration operation in the audit mode resulted in a validation error for one of the access nodes from the set of access nodes, and performing a configuration operation, in a realtime mode, on the set of access nodes to use the network feature if it is determined that configuration operation in the audit mode did not result in a validation error.

An exemplary system for identifying neighbor access nodes in a wireless network includes a set of access nodes located in a geographic region and a processing node communicatively coupled to the set of access nodes. The processing node is configured to perform operations including receiving information associated with a network feature for use by at least one access node in the set of access nodes, the network feature having at least one network operating parameter not previously available in the wireless network, performing a configuration operation on the set of access node to use the network feature based on a set of existing profiles for the set of access nodes, the configuration operation run in an audit mode, determining if the configuration operation in the audit mode resulted in a validation error for one of the access nodes from the set of access nodes, and performing a configuration operation in a realtime mode on the set of access nodes to use the network feature if it is determined that configuration operation in the audit mode did not result in a validation error.

An exemplary non-transitory computer readable medium is provided for identifying neighbor access nodes in a wireless network. The non-transitory computer readable medium stores instructions to perform multiple operations. The operations include receiving information associated with a network feature for use by at least one access node from a set of access nodes in a geographic area, the network feature having at least one network operating parameter not previously available in the wireless network, performing a configuration operation, in an audit mode, on the set of access to use the network feature based on a set of existing profiles for the set of access nodes, determining if the configuration operation in the audit mode resulted in a validation error for one of the set of access nodes, and performing a configuration operation in a realtime mode on the set of access nodes to use the network feature if it is determined that configuration operation in the audit mode did not result in a validation error.

BRIEF DESCRIPTION OF THE DRAWINGS

FIG. 4 illustrates an exemplary method for validating network features in a wireless network.

FIG. 5 is a table illustrating an exemplary network feature list used with validating network features in a wireless network.

FIG. 7 is validation entry table used as part of performing a configuration operation as part of validating network features in a wireless network.

FIG. 8 is a table illustrating an exemplary validation report generated as part of validating network features in a wireless network.

DETAILED DESCRIPTION

Figure 1:
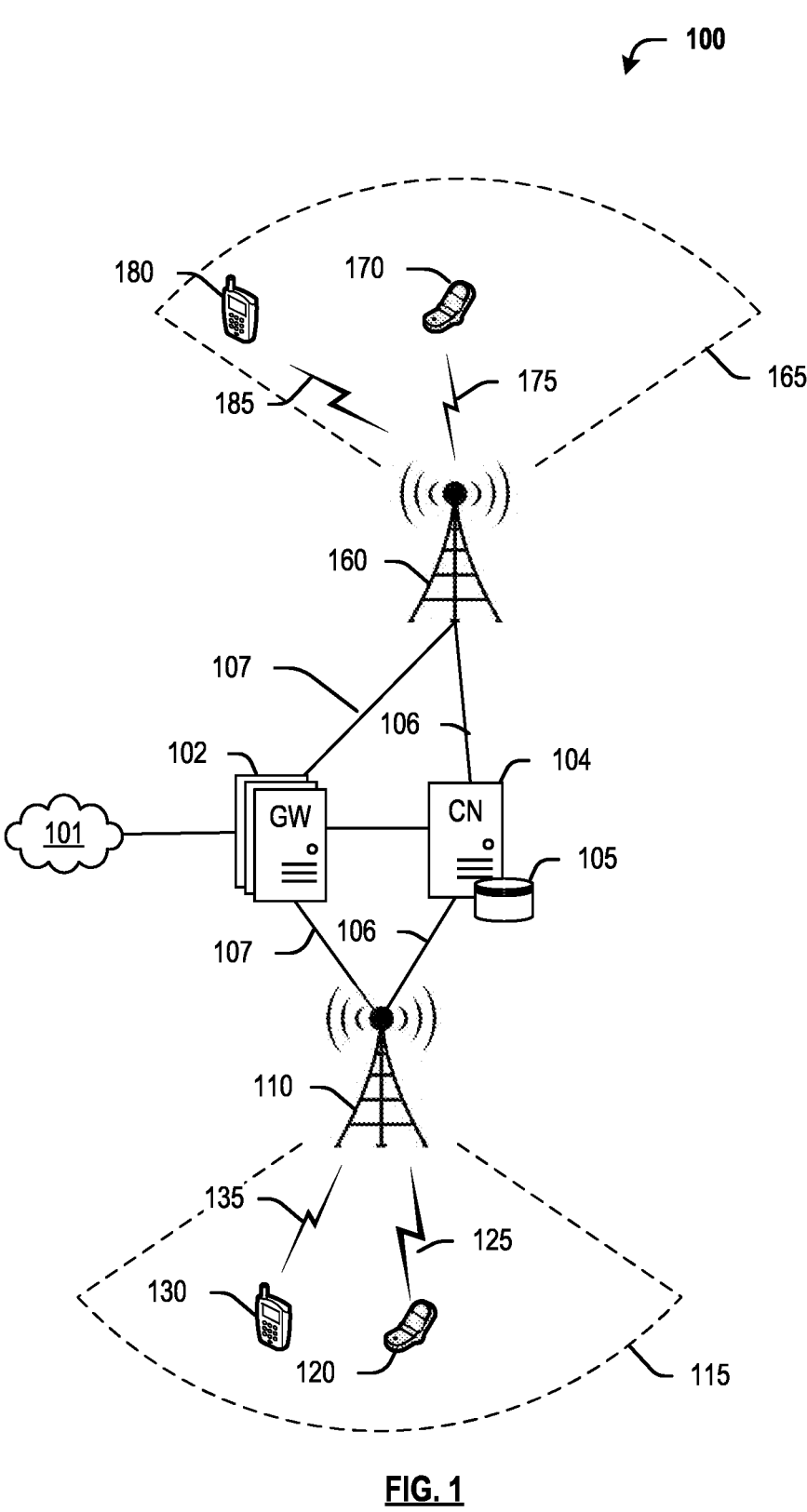
FIG. 1 illustrates an exemplary system for validating network features in a wireless network.

The disclosed embodiments illustrate methods, systems, and computer readable mediums for validating network features in a wireless network that includes a set of access nodes by performing a configuration operation using an audit mode, on the set of access nodes to use the network feature prior to performing the configuration operation in a normal or realtime mode as part of the operation support system (OSS) for the wireless network. Each of the access nodes may include an access node of any type, including macrocell access nodes such as Long-Term-Evolution (LTE) eNodeBs or 5G New Radio (NR) gNodeBs, mini access nodes, home eNodeBs or gNodeBs, etc. The configuration operation, in audit mode, is performed on the set of access nodes based on a set of existing profiles for the set of access nodes. The set of profiles contain operating parameters used by the access nodes during operation. The configuration operation performed in audit mode on the set of access nodes is used to validate the operation of the network feature with the set of access nodes by determining if an error or discrepancy exists with the configuration of one or more of the access nodes. If no errors or discrepancy exists, then the configuration operation can be performed on the set of access nodes in a normal or realtime mode in order to implement and use the network feature. If an error or discrepancy is identified, then the error or discrepancy can be addressed or corrected prior to performing the configuration operation in the realtime mode. As such, the configuration operation in audit mode uses the configuration information for the access nodes but does not make any changes to the access nodes. The configuration operation in realtime mode may make changes to the configuration information, such as operating parameters, for the access nodes in order to implement the network feature.

The validation of a network feature in a wireless network using an audit mode as part system configuration for access nodes in a wireless network can have an impact on the operational performance of the wireless network. Currently, a technician making a change to the configuration of the wireless network to implement a new feature by performing a configuration operation on a set of access nodes in a normal or realtime mode can result in an initial performance degradation if there is an error in the configuration change. The performance degradation may include an increase in dropped calls, reduced data rates for customers, or lower values of other key process indicators. By creating an audit mode for the configuration operation, the current configuration for the access nodes with the network and produce validation results to determine the changes, if any, that are needed prior to implementing the changes into the wireless network as part of the normal or realtime configuration operation.

Similar operations may be performed by an exemplary system described herein and comprising at least a processing node and a processor coupled to the processing node. The processing node can be communicatively coupled to any other network node within the wireless network, such as an access node or a controller node. These and other embodiments are further described herein and with reference to FIGS. 1-8.

FIG. 1 depicts an exemplary system 100 for identifying neighbor access nodes in a wireless network. System 100 comprises a communication network 101, gateway node 102, controller node 104, access nodes 110 and 160, and wireless devices 120, 130, 170. and 180. Collectively, gateway node 102, controller node 104, access node 110, and access node 160 may be referred to as network nodes. Access node 110 and access node 160 may include an access node of any type, including macrocell access nodes such as Long-Term-Evolution (LTE) eNodeBs or 5G New Radio (NR) gNodeBs, mini access nodes, home eNodeBs or gNodeBs, etc.

Each one of access nodes 110 and 160 may include a plurality of antennae arranged in one or more arrays, wherein each antenna array is configured to steer or form one or more beams to wireless devices attached thereto, including wireless devices 120, 130. Access node 110 communicates with wireless devices 120, 130 over corresponding wireless communication links 125, 135 located within a communication sector 115. Similarly, access node 160 communicates with wireless devices 170 and 180 over corresponding communication links 175 and 185 within a communication sector 165. The area of coverage for communication sectors 115 and 165 can be determined by characteristics for the antennae used in access nodes 110 and 150. The communication links 125, 135, 175, and 185 can include direct communication links, formed beams, multiple-input-multiple-output (MIMO), and so on.

The communication links 125, 135, 175, and 185 are created based on a communication protocol. The communication protocol that is used is based on the technology capabilities of the wireless devices 120, 130, 170, and 180 as well as access nodes 110 and 160. For example, wireless devices 120 and 130 as well as access node 110 may be capable of communicating over communication links 125 and 135 using 5G RATs. Wireless devices 120 and 130 contact access node 110 in order to establish communication links 125 and 135. Access node 110 establishes the communication link based on a set of network technical operating parameters. The set of network technical operating parameters, referred to as a network feature, may include the type of communication duplexing mode that is used. The duplexing mode may typically be either frequency diversity duplexing (FDD) or time diversity duplexing (TDD). The parameters may also include the bandwidth for the communication channels, the size of the physical resource blocks (PRBs) in the bandwidth profile (BWP) for the communication channel, accessibility of PRBs in the BWP, and other special operating modes, such as power saving mode. The type of operating mode the control channel for the uplink interface between an access node and a user. The access node 110 may also establish upstream and downstream control channels between the access node 110 and wireless devices 120 and 130, referred to as the physical uplink control channel (PUCCH) and physical downlink control channel (PDCCH). Each of these control channels may operate in different modes and communicate upstream control information (UCI) and downstream control information (DCI), respectively, in these different modes.

In some embodiments, one or more of the communication links 125, 135, 175, and 185 may be created as part of a self organizing network (SON). A SON is a framework for network automation across 3 primary areas: network configuration management, optimization and self-healing. A SON is a collection of modules which helps eliminate manual configuration of network elements from deployment right through to dynamic optimization. A SON makes changes to the network by sending plans to the operation system support (OSS). SON functions across all technologies and vendors. A SON is typically employed in implementations associated with local area network or Wi-Fi communication network and improves customer performance by automatically connecting wireless devices (e.g., wireless devices 120, 130, 170, and 180) to the best Wi-Fi band available. Similar techniques may also be applied to longer range wireless mobile networks as described here.

System 100 is shown having two access nodes 110 and 160 in geographic proximity to each other. As such, access nodes 110 and 160 may be referred to as a set of access nodes in a geographic area. Further, access node 110 and access node 160 are shown operating one communication sector 115 and 165, respectively. Each of the access nodes 110, 160 establish communication links with wireless devices, in their communication sectors 115 and 165, respectively, based on profiles that are created for the access node in order to implement one or more network features used in system 100. In some embodiments, access node 110 and/or access node 160 may include antennae configured to communicate over corresponding wireless communication links in more than one communication sector. In some embodiments, more than two access nodes may be present within the geographic area. In other embodiments, different communication protocols may be used.

As described herein, a network node (e.g., gateway node 102 or controller node 104) communicatively coupled to other network nodes (e.g., access nodes 110, 160) within system 100 can be configured to validate features in a wireless network prior to implementing and using the feature in the network nodes. The validation includes receiving information associated with a network feature for use by at least one access node in a geographic area. The network feature has at least one network operating parameter not previously available in the system. The validation also includes performing a configuration operation, in an audit mode, on a set of access nodes in a geographic area to use the network feature based on a set of existing profiles for the set of access nodes. The validation additionally includes determining if the configuration operation in the audit mode resulted in any validation errors for one of the access nodes in the set of access nodes. If the configuration operation in audit mode did not result in any validation errors, then the configuration operation can be performed in a realtime mode on the set of access nodes in order to implement and use the network feature in the geographic area.

In some embodiments, if the configuration operation in audit mode results in one or more validation errors, then the validation error(s) can be corrected, and the configuration operation can be performed in a realtime mode on the set of access nodes in order to implement and use the network feature in the geographic area. For example, the validation error may be an incorrect or missing profile for an access node that matches the network operating parameters associated with the network feature. In this case, the correction may include creating a new profile that matches the network operating parameters and including the new profile as part of the set of existing profiles. In some embodiments, if the configuration operation in the audit mode results in one or more validation errors, a validation report can be generated and provided to a technician for review and correction.

It is worth noting that the configuration operation is performed in audit mode prior to performing the configuration operation in realtime mode in order to reduce or eliminate any performance degradation, such as dropped calls, reduced data rates for customers, or low values of other key process indicators, that can result from the undesirable introduction of configuration errors into the wireless network.

Access node 110 and access node 160 can be any network node configured to provide communication between wireless devices (e.g., wireless devices 120, 130 and 170, 180 respectively) and communication network 101, including standard access nodes and/or short range, low power, small access nodes. For instance, access node 110 and/or access node 160 may include any standard access node, such as a macrocell access node, base transceiver station, a radio base station, next generation or gigabit NodeBs (gNBs) in 5G networks, or the like. In an exemplary embodiment, a macrocell access node can have a coverage area in the range of approximately five kilometers to thirty five kilometers and an output power in the tens of watts. In other embodiments, one or both of access node 110 and access node 160 can be a small access node including a microcell access node, a picocell access node, a femtocell access node, or the like such as a home NodeB or a home eNodeB device.

Access nodes 110 and 160 can comprise processors and associated circuitry to execute or direct the execution of computer-readable instructions to perform operations such as those further described herein. Briefly, access nodes 110 and 160 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110 and 160 can receive instructions and other input. Access node 110 and access node 160 communicate with gateway node 102 and controller node 104 via communication links 106, 107. Access node 110 and/or access node 160 may communicate with other access nodes (not shown) using a direct link such as an X2 link or similar.

Wireless devices 120, 130, 170, and 180 may be any device, system, combination of devices, or other such communication platform capable of communicating wirelessly with access node 110 and access node 160, respectively, using one or more frequency bands deployed therefrom. Wireless devices 120, 130, 170, and 180 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, 170, and 180. Wireless network protocols can comprise Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path-including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as signaling capabilities and historical signal conditions for wireless devices attached to access node 110 and/or access node 160, default operational parameters, such as frequencies or carrier spacings, for communication sectors deployed by access node 110 and/or access node 160, and so on. This information may be requested by or shared with access node 110 and/or access node 160 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between access nodes 110 and 160 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
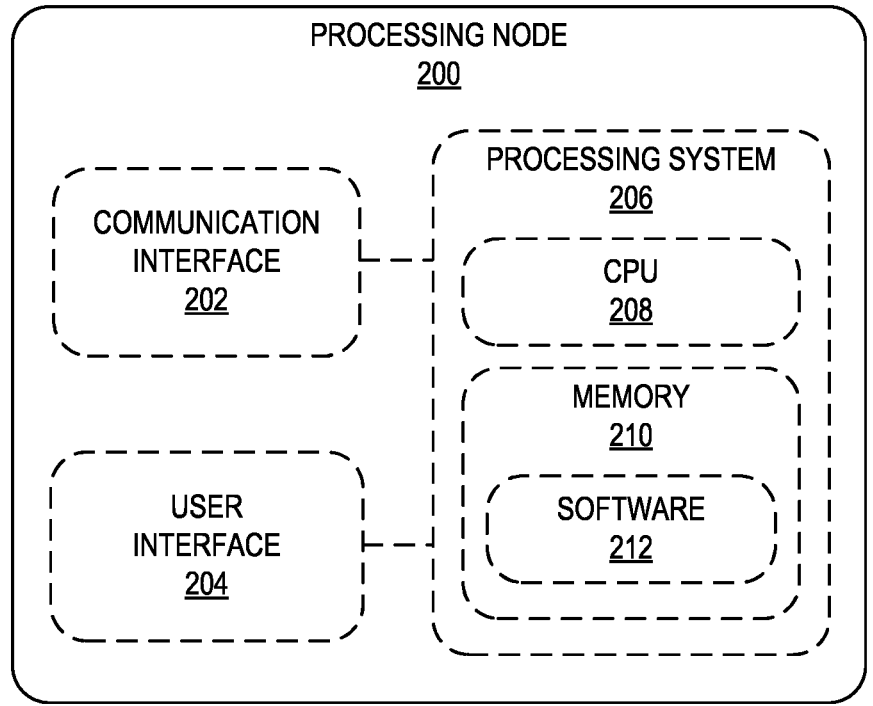
FIG. 2 illustrates an exemplary processing node used in a system for validating network features in a wireless network.

FIG. 2 depicts an exemplary processing node 200 for identifying neighbor access nodes in a wireless network. Processing node 200 comprises a communication interface 202, entry interface 204, and processing system 206 in communication with communication interface 202 and entry interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. Entry interface 204 permits the configuration and control of the operation of processing node 200.

In an exemplary embodiment, software 212 includes instructions that enable CPU 208 to perform operations for validating features in a wireless network that include receiving information associated with a network feature for use by one or more access nodes from a set of access nodes in a geographic area, the network feature having one or more network operating parameters not previously available in the wireless network. For example, the network operating parameter may be a new network operating parameter, such as a new power saving mode of operation. In addition, or as an alternative, the network operating parameter may be a new value for an existing network operation parameter, such as a new bandwidth, a new band of frequencies for operation, and/or a new channel frequency.

The software 212 also include instructions that enable CPU 208 to further perform a configuration operation, in an audit mode, on the set of access node in the geographic area to use the network feature based on a set of existing profiles for the set of access nodes and determine if the configuration operation in the audit mode resulted in a validation error for one of the set of access nodes. Further, the instructions enable CPU 208 to perform a configuration operation in a realtime mode on the set of access nodes to use the network feature if it is determined that the configuration operation in the audit mode did not result in a validation error. In some embodiments, the instructions for performing the configuration operation in realtime mode may include instructions for re-tuning the set of access nodes while performing the configuration operation in audit mode does not include re-tuning the set of access nodes.

In some embodiments, software 212 includes instructions that enable CPU 208 to generate a validation report and provide the validation report if it is determined that the configuration operation in audit mode resulted in validation errors. The instructions may further enable CPU 208 to perform a configuration operation in realtime mode when the validation errors are corrected.

Figure 3:
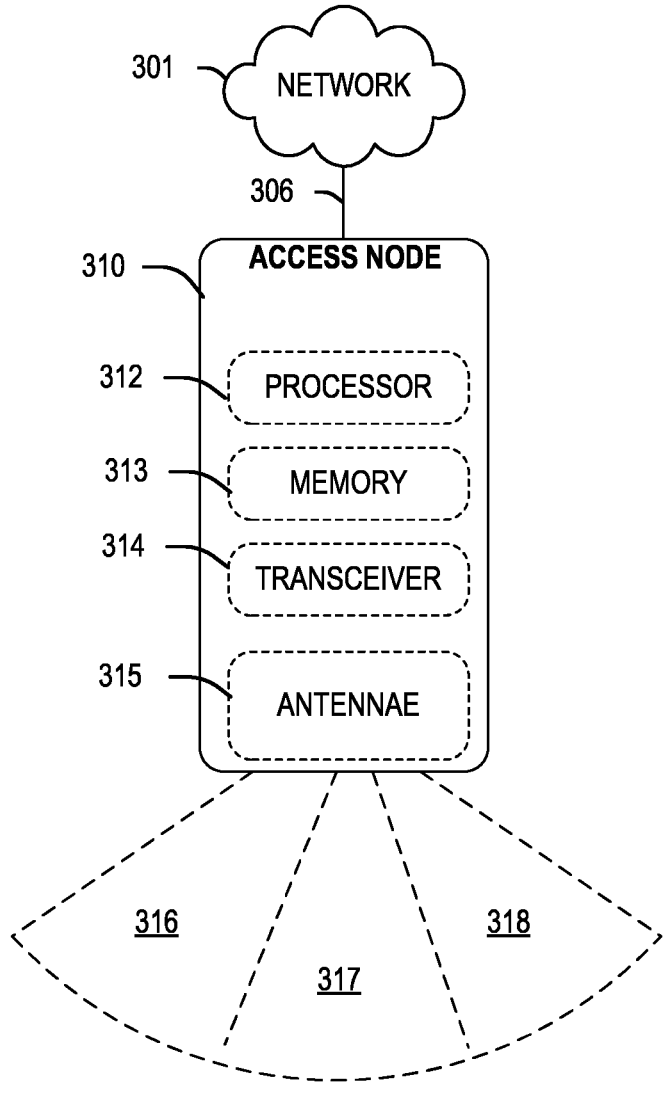
FIG. 3 illustrates an exemplary access node used in a system for validating network features in a wireless network.

FIG. 3 depicts an exemplary access node 310 for use in conjunction with identifying neighbor access nodes in a wireless network. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over communication sectors 316, 317, and 318. One transceiver and set of antennae are illustrated herein solely to simplify the written description, and it may be evident to those having ordinary skill in the art, that any combination of transceivers and antennae may be incorporated in order to deploy different communication sectors that are configured to facilitate wireless communication with other network nodes on network 301. For example, antennae 315 may include a first directional antenna for communicating wireless signals in communication sector 316, a second directional antenna for communicating wireless signals in communication sector 317, and a third directional antenna for communicating wireless signals in communication sector 318. Further, access node 310 is communicatively coupled to network 301 via communication interface 306, which may be any wired or wireless link as described above.

In an exemplary embodiment, access node 310 may be communicatively coupled via interface 306 to a processor node (e.g., processor node 200) over network 301, with the processor node configured to perform operations for validating network features in a wireless network containing access node 310. In some embodiments, access node 310 may provide information to the processing node regarding its current operating configuration. The processing node may request the information while performing a configuration operation in audit mode. The information can include the current profile being used by access node 310 or may include specific configuration parameters being used by access node 310. In addition, or as an alternative, the processing node may send instructions to access node 310 over network 301 while performing a configuration operation in real time mode. The instructions may include a command to re-tune access node 310 along with a new set of configuration parameters for the re-tune.

FIG. 4 illustrates an exemplary method for identifying neighbor access nodes in a wireless network. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, information associated with a network feature for use by at least one access node from a set of access nodes in a geographic area is received. The network feature has utilized at least one network operating parameter not previously available in the wireless network. The network operating parameter may include, but is not limited to, a frequency band, a channel frequency, a channel bandwidth, a duplexing mode, power saving mode, and the like. The set of access nodes may include one or more access nodes capable of operation using a 5G RAT. These access nodes may include macrocell access nodes such as 5G New Radio (NR) gNodeBs, mini access nodes, home gNodeBs, and the like. In some embodiments, one or more of the access nodes may also be capable of operation in using other RATs.

At 420, a configuration operation is performed on the set of access nodes in the geographic area to use the network feature. The configuration operation, at 420, is performed in audit mode using a set of existing profiles for the set of access nodes. In some embodiments, the set of existing profiles may be included in a profile list or profile file.

At 430, a determination is made as to whether the configuration operation performed in the audit mode, at 420, results in validation errors for one or more of the access nodes in the set of access nodes. If, at 430, the determination is made that the configuration operation does not result in any validation errors for the set of access nodes, a configuration operation is performed, at 440, to configure the set of access modes to use the network feature in the geographic area. The configuration operation, at 440, is performed in a realtime mode. It is worth noting that the configuration operation, at 440, performed in a realtime mode is different from the configuration operation, at 420, performed in an audit mode. In some embodiments, the configuration operation, at 440, may include re-tuning the set of access nodes. In contrast, the configuration operation, at 420, does not include re-tuning access nodes in order to prevent any changes being implemented in the OSS as a result of this configuration operation.

In some embodiments, If, at 430, the determination is made that the configuration operation, performed at 420, results in validation errors for one or more of the access nodes in the set of access nodes, a validation report may be generated as part of the determination. For example, the validation report may include the profile or specific operating parameter in a profile in which the discrepancy or error is identified for one or more of the access nodes. The validation report may also identify the lack of existence of a profile that includes all of the proper configuration parameters for one or more of the access nodes. The validation report may be provided in order to take corrective action for the discrepancies or errors. For example, one corrective action may include creating a new profile and adding the new profile to the list of existing profiles for the set of access nodes. Once the corrections are made, the configuration operation in realtime mode is performed, at 440, to configure the set of access modes to use the network feature in the geographic area as described above.

FIG. 5 is a table illustrating an exemplary network feature list 500. Network feature list 500 may be used as part of validating network features in a wireless as described above. More specifically, the network feature list 500 may include information associated with a new network feature for use in or more access nodes in a wireless network. Network feature list 300 contains a set of network features used in wireless networks that operate with 5G RATs. In addition, or as an alternative, network feature list 300 may contain features that can be used in wireless networks that operate using different RATs.

Network feature list 500 includes a header 510 along with a set of rows 541-556 below header 510. Header 510 includes identifiers for the columns 520-536. Each of columns 520-528 identifies a network operating parameter that is used to create the network feature for each BWP in 5G RAT. More specifically, column 520 identifies the technical operating parameters used for the network feature. The technical operating parameters may include, but are not limited to, the duplexing mode (e.g., FDD or TDD), the size of the PRBs in the BWP, accessibility of PRBs in the BWP, and other special operating modes (e.g., Power Saving mode). Column 522 indicates the frequency bandwidth (BW), in megahertz (MHz) for the channels in the BWP. Column 524 indicates whether dynamic sequence sharing (DSS) is used with the network feature. Column 525 indicates whether the feature operates as a standalone (SA) or non-standalone (NSA) deployment. A network feature that is SA uses a 5G RAN with 5G core architecture and operations support system OSS. A network feature that is NSA uses a 5G RAN with a 4G (LTE) architecture. Column 528 indicates the type of operating mode the control channel for the uplink interface between an access node and a user device (e.g., PUCCH. The modes may include, but are not limited to, long code and short code. As shown, network feature list 500 includes five network operating parameters in columns 520-528. In other embodiments, more or fewer network operating parameters may be included, and the number of columns adjusted accordingly.

Each of columns 530-536 identifies one or more profiles that can be used by the OSS to implement the network feature, identified by rows 540-556, in one or more possible configurations, identified as different types of BWPs. More specifically, column 530 identifies the profile that can be used to implement the network feature as part of an initial BWP. Column 532 identifies the profile that can be used to implement the network feature as part of a large dedicated BWP. Column 534 identifies the profile that can be used to implement the network feature as part of a small dedicated BWP. Column 536 identifies the profile that can be used to implement the network feature as part of a power saving BWP.

Each of the rows 541-556 identify a network feature. The network feature identified in each row is defined by the values given in one or more of columns 520-528 for that row. Further, each of the rows identify the profile that can be used to implement the network feature for one or more of the BWP types in columns 530-536. For example, row 541 is for a network feature that uses FDD with a 5 MHz BW, is nonDSS, can use SA or both SA and NSA, and uses a long code for the control channel mode, as shown in columns 520-528. Further, the network feature identified in row 541 can be implemented using a profile as part of an initial BWP, as shown in column 530, and using a profile as part of a large dedicated BWP, as shown in column 532. Columns 534 and 536 do not identify a profile that can be used to implement the network identified in row 541. Notably, entries in columns 534 and 536 are not present for some of the rows 541-556 as not all BWP types are possible for all network features.

Figure 6:
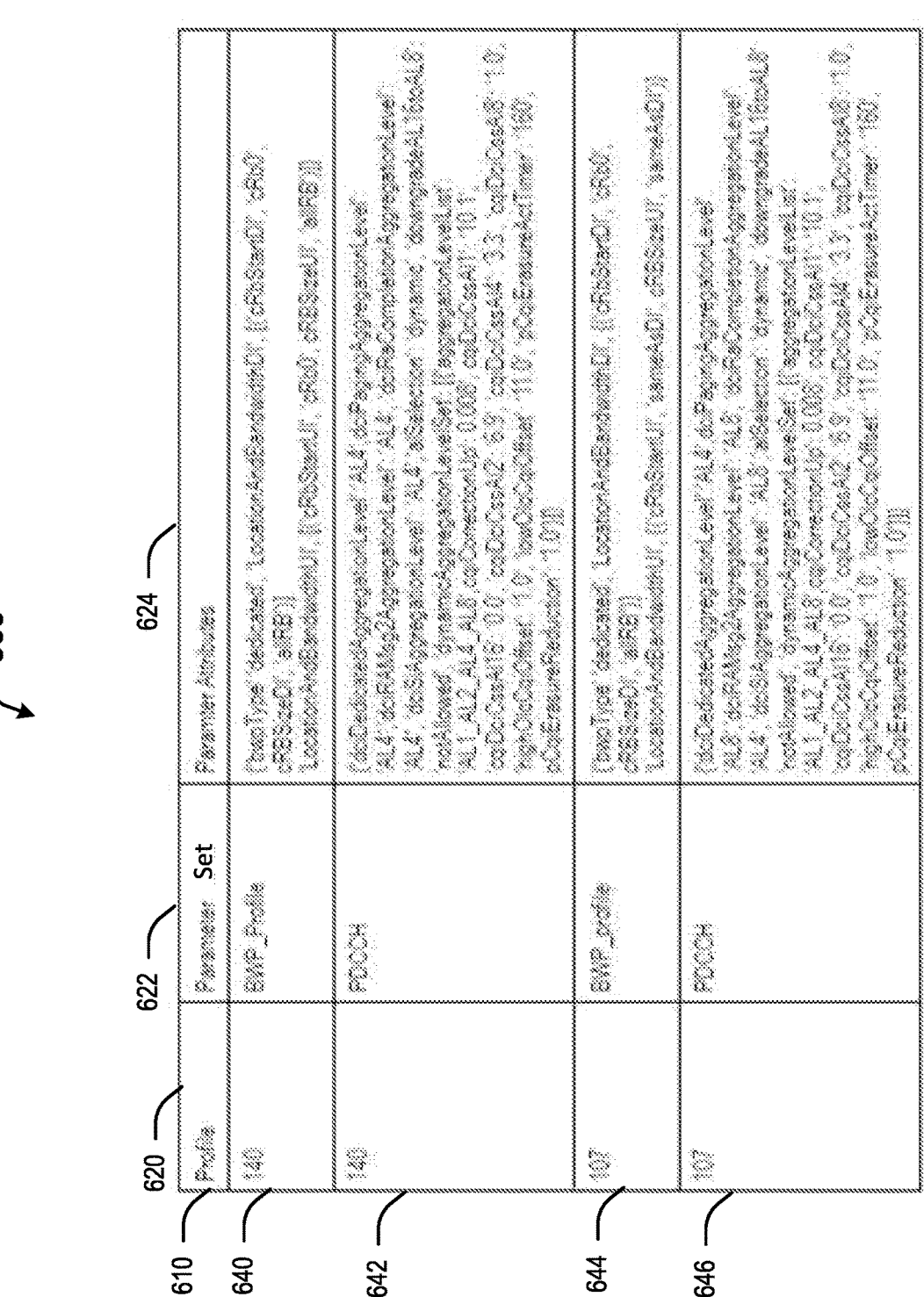
FIG. 6 is a table illustrating an exemplary profile list used with validating network features in a wireless network.

FIG. 6 is a table illustrating an exemplary profile list 600. Profile list 600 may be used as part of validating network features in a wireless network as described above. More specifically, profile list 600 may contain a set of existing profiles that are identified in a network feature list, such as network feature list 300, and used by a set of access nodes in a geographic area as part of a wireless network. The profiles included in profile list 600 are used by a processing device, such as processing node 200 described in FIG. 2 or controller node 104 described in FIG. 1, as part of configuring wireless networks that operate with 5G RATs. In addition, or as an alternative, profile list 600 may contain profiles that can be used in wireless networks that operate using different RAT. It is worth noting that for the simplicity of description, only two profiles are shown in profile list 600. In other embodiments, a feature list may include more or fewer profiles, and may generally include all profiles identified in a network feature list.

Profile list 600 includes a header 610 along with a set of rows 640-646 below header 610. Header 610 includes identifiers for the columns 620-624 that identify a parameter associated with each of the profiles in rows 640-646. Column 620 identifies the profile number for the profile. Column 622 identifies an operating parameter for the profile identified in column 620. More than one operating parameter may be associated with a profile number, with each operating parameter shown in consecutive rows as a group with the same profile number. As shown, the profile labeled "140" includes two operating parameters, labeled "BWP_Profile" in row 640 and "PDCCH" in row 642. Similarly, the profile labeled "107" includes the same operating parameters in rows 644 and 646. In other embodiments, each profile may include different parameters as well as more or fewer operating parameters than shown in FIG. 6. Column 624 identifies the parameter attributes for the parameter sets (e.g., MO) identified in column 622. For example in 5G network, cell level parameters are in NRCELL, site level parameters are in NRBTS. The parameter attributes in column 624 for each of the operating parameters in rows

640-646 are shown as software code identifying various attributes along with values or value ranges and/or conditional statements for the attribute. In other embodiments, the parameter attributes may be shown in a different manner, such as a listing of attributes and associated values.

FIG. 7 is an exemplary screenshot 700 from an entry interface used as part of performing a configuration operation in either an audit mode or a realtime mode. Screenshot 700 may be displayed on a display screen or display device included as part of entry interface 204 in processing node 200. Screenshot 700 includes a header 710 along with a set of rows 730 to 780 positioned below header row 710. Each of rows 730 to 780 include input entry in column 715, and a description associated with the request, in column 720. Each of the rows 730 to 780 also includes an entry box 735 to 785, respectively.

More specifically, row 730 includes a numerical input as a confirmation for safety. An engineer enters input accepting the risk of making changes to the network and will verify the sites are on air after parameters are changed.

Row 740 includes xml file 745 with new frequency or bandwidth before a retune. The xml file may be input to the OSS to check for validation errors before changes are made to the OSS. The xml file information may include changes, including changes to the set of profiles, used as part of implementing and using a network feature with the access nodes.

Row 750 includes unused BWP 755, as part of the profiles, to be created during operation in audit mode.

Row 770 includes whether to use exclusion lists as part of the configuration operation. The exclusion lists may be created and used as part of the configuration of a SON or other lists used to filter out target access nodes or cells. Dropdown entry box 775 may also include the names of one or more exclusion lists that can be used.

Row 780 includes the mode of operation with respect to configuration of a SON as part of the configuration operation. As described above, most. Dropdown entry box 785 may also include "Closed Loop" to select the realtime mode for the configuration operation. In this mode, the information in the file selected in row 740 can be pushed to the OSS for implementation and re-tuning of the access nodes in the wireless network.

FIG. 8 is a table illustrating an exemplary validation report 800. Validation report 800 may be generated as part of validating network features in a wireless network. More specifically, validation report 800 may be generated as part of performing a configuration operation in an audit mode on a set of access nodes to use a network feature. Validation report 800 contains a list of error settings on the site. Validation report 800 includes a header 810 along with a set of rows 840-846 below header 810. Header 810 includes identifiers for the columns 820-832. Column 820 identifies the site that was used.

The site represents a geographic area that contains the set of access nodes that were tested as part of the configuration operation. Column 822 identifies a cell for the access node that has been found to have a discrepancy in its configuration. The parameters in columns 820 and 822 for the site and cell may include information identifying the sitename for the access node as well as any specific antenna or sector information for that access node. Column 826 identifies a parameter set (e.g., MO). The parameter set includes objects containing the parameters. Column 828 identifies the OSS value. The OSS value is the current setting for the site. Column 830 identifies a profile of a parameter name and audit values. The value is the change to be made to the network. Column 832 identifies an action such as an update or create. An "update" is a change to parameters. "Create" creates new objects on the site.

Each of rows 840-846 in validation report 800 identifies a different error or discrepancy generated as a result of the configuration operation performed in an audit mode. Each of the rows 840-846 include errors or discrepancies.

Errors or discrepancies for more than cell and/or more than one site may be generated and included in the validation report. Additionally, additional columns may be present in the validation report that include additional information associated with the cell, the configuration parameters, and/or the errors or discrepancies.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the disclosure. The following claims specify the scope of the disclosure. Note that some aspects of the best mode may not fall within the scope of the disclosure as specified by the claims. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A method for validating features in a wireless network, the method comprising:

receiving information associated with a network feature for use by at least one access node from a set of access nodes in a geographic area, the network feature having at least one network operating parameter not previously available in the wireless network;

performing a configuration operation, in an audit mode, on the set of access nodes in the geographic area to use the network feature based on a set of existing profiles for the set of access nodes, wherein performing the configuration operation in the audit mode comprises running the configuration operation to create a list of at least one unused bandwidth part (BWP) for inclusion in one or more existing profiles;

determining if the configuration operation in the audit mode resulted in a validation error for one of the access nodes from the set of access nodes; and performing a configuration operation, in a realtime mode, on the set of access nodes to use the network feature based on the set of existing profiles if it is determined that the configuration operation in the audit mode did not result in a validation error.

2. The method of claim 1, wherein the realtime mode includes re-tuning the set of access nodes.

3. The method of claim 1, wherein the set of existing profiles are included in a profile file.

4. The method of claim 1, further comprising:

correcting the validation error if it is determined that a validation error is reported; and performing a configuration operation in the realtime mode on the set of access nodes to use the network feature.

5. The method of claim 4, wherein correcting the validation error includes creating a new profile for the set of access nodes.

6. The method of claim 1, wherein the network operating parameter includes at least one of a frequency band, a channel frequency, a channel bandwidth, a duplexing mode, and a power saving mode.

7. The method of claim 1, wherein determining if the configuration operation in the audit mode resulted in a validation error further includes:

generating a validation report; and providing the validation report.

8. The method of claim 1, wherein the set of access nodes is a set of access nodes capable of operation using 5G radio access technology.

9. A system for identifying neighbor access nodes in a wireless network, the system comprising:

a set of access nodes located in a geographic region; and a processing node communicatively coupled to the set of access nodes, the processing node configured to perform operations comprising:

receiving information associated with a network feature for use by at least one access node in the set of access nodes, the network feature having at least one network operating parameter not previously available in the wireless network;

performing a configuration operation, in an audit mode, on the set of access node to use the network feature based on a set of existing profiles for the set of access nodes, wherein performing the configuration operation in the audit mode comprises running the configuration operation to create a list of at least one unused bandwidth part (BWP) for inclusion in one or more existing profiles;

determining if the configuration operation in the audit mode resulted in a validation error for one of the access nodes from the set of access nodes; and performing a configuration operation in a realtime mode on the set of access nodes to use the network feature if it is determined that the configuration operation in the audit mode did not result in a validation error.

10. The system of claim 9, wherein the realtime mode includes re-tuning the set of access nodes.

11. The system of claim 9, wherein the set of existing profiles are included in a profile file.

12. The system of claim 9, further comprising:

correcting the validation error if it is determined that a validation error is reported; and performing a configuration operation in the realtime mode on the set of access nodes to use the network feature.

13. The system of claim 12, wherein correcting the validation error includes creating a new profile for the set of access nodes.

14. The system of claim 9, wherein the network operating parameter includes at least one of a frequency band, a channel frequency, a channel bandwidth, a duplexing mode, and a power saving mode.

15. The system of claim 9, wherein determining if the configuration operation in the audit mode resulted in a validation error further includes:

generating a validation report; and providing the validation report.

16. The system of claim 9, wherein the set of access nodes is a set of access nodes capable of operation using 5G radio access technology.

17. A non-transitory computer readable medium, storing instructions executed by a processor to perform operations comprising:

receiving information associated with a network feature for use by at least one access node from a set of access nodes in a geographic area, the network feature having at least one network operating parameter not previously available in a wireless network;

performing a configuration operation, in an audit mode, on the set of access nodes in a geographic area to use the network feature based on a set of existing profiles for the set of access nodes, wherein performing the configuration operation in the audit mode comprises running the configuration operation to create a list of at least one unused bandwidth part (BWP) for inclusion in one or more existing profiles;

determining if the configuration operation in the audit mode resulted in a validation error for one of the access nodes from the set of access nodes; and performing a configuration operation in a realtime mode on the set of access nodes to use the network feature if it is determined that the configuration operation in the audit mode did not result in a validation error.

18. The non-transitory computer readable medium of claim 17, further comprising:

correcting the validation error if it is determined that a validation error is reported; and performing a configuration operation in the realtime mode on the set of access nodes to use the network feature.

19. The non-transitory computer readable medium of claim 17, wherein determining if the configuration operation in the audit mode resulted in a validation error further includes:

generating a validation report; and providing the validation report.

20. The non-transitory computer readable medium of claim 17, wherein the realtime mode includes re-tuning the set of access nodes.

\*   \*   \*   \*   \*